Nov. 4, 1969     R. B. SNYDER ET AL     3,476,672
ELECTRODE ASSEMBLY
Filed July 1, 1966
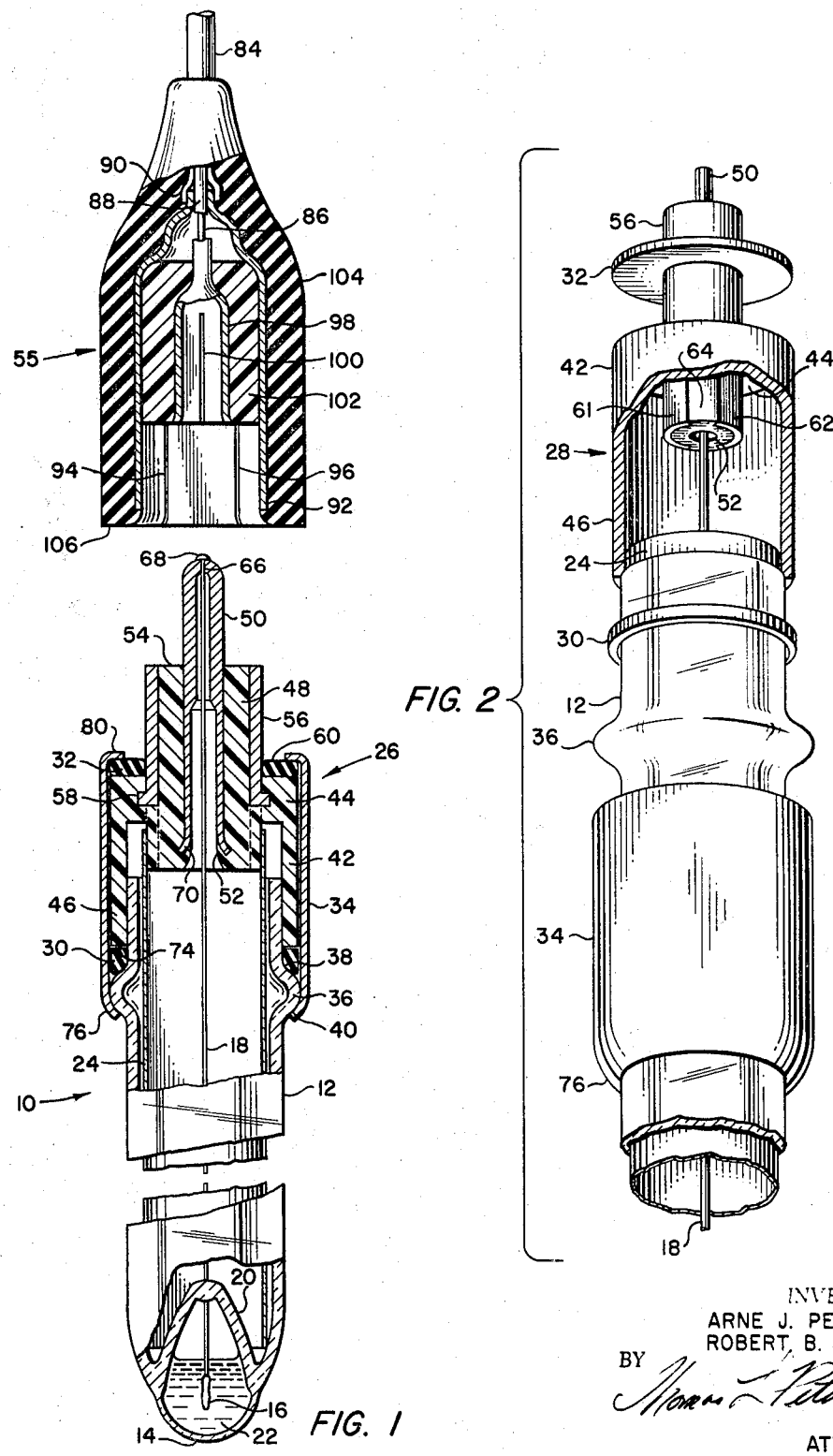
INVENTORS
ARNE J. PETERSEN
ROBERT B. SNYDER
BY
ATTORNEY

United States Patent Office 3,476,672
Patented Nov. 4, 1969

3,476,672
ELECTRODE ASSEMBLY
Robert B. Snyder, West Covina, and Arne J. Petersen, Balboa, Calif., assignors to Beckman Instruments, Inc., a corporation of California
Filed July 1, 1966, Ser. No. 562,298
Int. Cl. B01k 3/04
U.S. Cl. 204—195          13 Claims

ABSTRACT OF THE DISCLOSURE

A cap connector assembly for an electrochemical electrode which is adapted to be connected to a mating plug at the end of an electrical cable. The connector assembly comprises a body having a wall for surrounding a portion of the electrode tube and having an integral cylindrical portion for supporting a conductive connector, and a sleeve which engages the body and the electrode tube by having one end bear against an annular shoulder about the tube and the other end bear against the body for providing a hermetic seal therebetween.

---

This invention relates to an electrode assembly and, more particularly, to a cap incorporating electrical conductors for an electrode assembly.

There are a variety of electrode assemblies which require caps for electrical conductors extending out of the assemblies. Such electrode assemblies include, for example, glass and reference electrode for measuring the ion concentration of solutions. In such assemblies, an internal half cell positioned within a tube of nonconductive material has a conductor which extends into the cap closing the end of the tube. A cable, which is adapted to be connected to an external electrical circuit, extends into the cap for connection to the internal half cell. Conventionally, the caps are formed of either plastic or rubber and are assembled by hand. In case of rubber caps, oftentimes the cap is merely friction fitted over the end of the tube of the electrode assembly. Such a cap fails to provide a hermetic seal and thus is subject to leakage. When a plastic cap is utilized, it is normally affixed to the tube of the electrode assembly by means of adhesives or resins. These caps have the disadvantage that they are also supject to leakage and the assembly of such a cap to the tube of an electrode assembly is time consuming since several hours up to 24 hours are required for the preferential cement or resins to completely set, thus causing a delay in the production and testing of such electrodes. Also, when resins or adhesives are utilized, they must be mixed, renewed and stored, resulting in added costs of manufacturing.

What is needed, therefore, is an improved cap for an electrode assembly which provides a hermetic seal, requires a minimum number of parts and lends itself to mass production techiques. Also, it is desired that there be provided such a cap which is disconnectable from the cable to the external circuit so that the electrode assembly may be steam-sterilized, which is desired in various applications for certain electrode assemblies.

It is the principal object of the present invention to provide an improved cap for an electrode assembly.

Another object of the invetion is to provide a cap for an electrode assembly which is inexpensive to assemble and produces a hermetic seal so that no leakage will occur between the cap and the other parts of the electrode assembly.

Immediately below is presented a summary of a principal aspect of the present invention, such summary being intended to provide a ready understanding of the invention but not to serve in any way as a definition of the scope of the invention which is set forth in the appended claims. According to such principal aspect to the invention there is provided an electrode assembly having a tube of nonductive material terminating at one end with a sensing portion. Adjacent to the other end of the tube there is provided an outwardly extending annular shoulder. An annular seal surrounds the tube and is positioned against the shoulder. An electrical connector assembly, which includes inner and outer electrical connectors adapted to be connected to a plug on a cable which includes mating inner and outer connectors. closes the end of the tube and has an annular wall surrounding the tube with the end of the wall bearing against the annular seal. A sleeve surrounds the connector assembly and has flanges at each end thereof, with one flange bearing against the annular shoulder of the tube on the opposite side thereof from the annular seal. The other flange is formed by crimping or rolling the end of the sleeve over the end of the connector assembly so as to compress the annular seal between the shoulder on the tube and the end of the annular wall of the connector assembly, thus providing a hermetic seal between the connector assembly and the tube of the electrode assembly. Thus, the cap assembly is assembled to the electrode without the use of adhesives or resins, and requires only a minimum number of parts. Since the cable for the electrode assembly is not permanently connected thereto, and since a hermetic seal is provided, the electrode assembly may be steam-sterilized or totally immersed in a liquid without leakage occurring.

Other objects, aspects and advantages will become more apparent from the following description taken in connection with the accompanying drawing wherein:

FIG. 1 is a longitudinal sectional view of an electrode assembly incorporating the improved cap of the invention, with the cable plug for the cap also being shown in cross section but detached from the cap; and FIG. 2 is an exploded isometric view of the upper portion of the electrode assembly of the invention with a portion of the cap broken away to show the interior thereof.

Referring now to the drawing in detail, there is shown an electrode assembly, generally designated by numeral 10, which incorporates the novel features of the invention. The electrode assembly includes a tube 12 of nonconductive material, preferably glass, having at one end a sensing portion 14. As shown in the drawing, the sensing portion is an ion sensitive barrier or bulb of the type typically used in pH glass electrodes. Although the electrode assembly of the invention is being described herein as a glass electrode, it is understood that the invention is not limited to such an electrode and that the term "sensing portion" is intended to include within its meaning ion sensitive barriers of materials other than glass, liquid junction structures as utilized in electrochemical reference electrodes, the sensing portions of polarographic cells for the measurement of oxygen, such as described in U.S. Patent No. 2,913,386 to Clark, or any other type of active barrier.

The electrode 10 includes an internal half cell 16 having a conductor 18 sealed into a conical glass wall 20 which forms a closed reservoir for electrolyte 22 contacting the barrier 14. The conductor 18 for the half cell extends upwardly through the tube 12 and a cylindrical shield of metal foil 24 into a cap assembly, generally designated by numeral 26. The cap assembly includes an electrical connector assembly 28, FIG. 2, annular elastomeric seals 30 and 32, and a cylindrical metallic sleeve 34. The glass tube 12 has an outwardly extending annular shoulder 36 with upper and lower surfaces 38 and 40, respectively, by which the cap assembly 26 is secured to the tube.

The connector assembly 28 includes a molded plastic body 42 having a base portion 44, an annular wall 46 integral with the base portion and surrounding the upper end of the glass tube 12, and a cylindrical portion 48. An inner electrically conductive connector in the form of a cylinder 50 is mounted within an elongated passage 52 within the cylindrical portion 48 of the body. The connector 50 extends beyond the end 54 of the cylindrical portion 48 to provide a male connector for connection into a female receptacle of a plug 55, to be described later. Surrounding the male connector 50 and cylindrical portion 48 of the body 42 is an outer electrically conductive connector 56 which extends to the end 54 of the body 42 and has an outwardly extending flange 58 in the base portion 44 of the body 42 to ensure that the connector 56 is well secured into the body. The outer connector 56 extends beyond the end 60 of the seal 32 so as to provide a male connector adapted to be connected into a female receptacle of the plug 55.

As seen in FIG. 2, the male connector 56 has two downwardly extending legs 61 and 62 spaced apart to provide a bridge 64 of plastic between the base portion 44 and cylindrical portion 48, FIG. 1 so that the body 42 is integral with the connectors 50 and 56 being embedded therein, thereby providing a rugged, unitary connector assembly.

The male conductor 50 has a narrow passage 66 at its outer end for receiving the end of the half cell conductor 18. The conductor 18 is sealed into the passage 66 by means of a solder 68 on the outside of the connector 50.

Preferably the inner end 70 of the connector 50 is flared outwardly so that a portion of the plastic of the body 42 will enclose the inner surface of the end of the connector 50 whereby, when the plastic shrinks upon setting, there is ensured a tight sealing of the connector into the body of plastic.

The method of assembling the cap assembly of the invention can be best understood by referring to FIG. 2. Initially the bulb 14 is filled with the electrolyte 22 and the conductor 18 of the half cell sealed into the glass portion 20 in a manner disclosed in copending patent application Ser. No. 518,247 filed Jan. 3, 1966, assigned to the assignee of the present application, and now abandoned. The metal shield 24 is then positioned in the tube 12 surrounding the conductor. Thereafter, the annular seal 30 is positioned over the upper end of the tube 12 so as to be supported by the upper surface 38 of the annular shoulder 36 of the tube. The connector assembly 28 is then positioned over the upper end of the tube 12 so that the conductor 18 will enter the passage within the cylindrical connector 50 and the annular wall 46 will be positioned concentrically with respect to the tube. The connector assembly is dropped upon the annular seal 30 so that the end 74 of the annular wall 46 bears against the upper surface of the seal 30. The annular seal 32 is then positioned on the connector assembly 28. As seen in the drawing, the seal 32 covers the entire upper surface of the body 42.

Thereafter, the cylindrical metallic sleeve 34 is slipped over the lower end of the tube 12. As seen in FIG. 2, the sleeve 34, when it is initially slipped upon the tube 12 for assembly, has a cylindrical configuration except for an inwardly extending flange 76 at its lower end, which flange has an inner diameter slightly larger than the outer diameter of the tube 12 but less than the outer diameter of the shoulder 36. The sleeve 34 is moved upwardly on the tube 12 until the flange 76 abuts against the lower surface 40 on the shoulder 36. In such position, a portion 80 of the upper end of the sleeve 34 extends beyond the upper surface 60 of the annular seal 32. The end 80 of the sleeve is crimped or rolled over by a mechanical operation onto the seal 32. The end 80 of the sleeve is crimped or rolled under sufficient force to effect the deformation of both the seals 30 and 32 so as to provide a complete hermetic seal between the cap assembly 26 and the glass tube 12. After the cap assembly has been applied to the tube 12 in the above-described fashion, the end of the half cell conductor 18 is fixed into the passage 66 in the end of the connector 50 by means of solder 68 thereby providing an electrical connection for the half cell 16 via the conductor 18 and male connector 50 to the plug 55. Also, as the cap 26 is assembled to the tube 12, the electrical shield 24 contacts the legs 61 and 62 of outer male connector 56 to provide an electrical connection therebetween. If desired, the shield 24 may be soldered or cemented with conductive resins to the legs 61 and 62 prior to assembling the cap to the tube 12.

The electrical plug 55 for the electrode assembly 10 is formed on the end of a shielded electrical cable 84. The cable has an inner conductor 86 covered by an insulation sleeve 88 and a braided metallic shield 90 surrounding the insulation sleeve 88. The braided shield 90 is electrically connected to an outer female connector 92 which has an inner diameter of essentially the same dimension as the outer diameter of the male connector 56. The female connector 92 has a plurality of slots 94 and 96 therein providing flexibility in the connector for friction fit with the outer male connector 56. The inner conductor 86 is soldered to the end of an inner female connector 98 which has an inner diameter of essentially the same dimension as the outer diameter of connector 50. The female connector 98 also includes a plurality of slots, only one being shown at 100. The female connectors 92 and 98 are spaced apart by a plastic insulation sleeve 102. The above-described assembly is encased in an elastomeric jacket 104. It can be readily appreciated that when the plug 55 is moved longitudinally toward the cap assembly 26 of the electrode 10, the inner male connector 50 will be received within the female connector 98 and the outer male connector 56 will be received by the outer female connector 92, thereby providing electrical connection between the sets of connectors. When the plug 55 is firmly seated upon the cap assembly 26, the lower edge 106 of the jacket 104 is in sealing relationship with the seal 32 and the crimped end 80 of the sleeve 34, thereby providing a liquid tight seal between the plug and cap assembly.

Although the connectors for the plug and cap assembly have been shown as being of the friction contact type, it should be understood that the connectors could also be of the screw-thread, or a bayonet type, if it is desired that a more secure connection be provided between the plug and cap assembly.

It can be appreciated that by the present invention, a simple cap assembly is provided for an electrode, requiring only a minimum number of parts, and not requiring the use of adhesives or resins which require substantial time to set and cause delay in production of electrodes. Also, by the invention a hermetically sealed cap assembly is provided, with the connectors of the electrode being disengagable from the plug so that the electrode may be steam-sterilized, without danger of leakage into the interior of the electrode assembly.

While the invention has been described specifically as being applicable to an ion sensing electrode, as indicated previously, it is also applicable to other types of electrodes. For example, the cap assembly of the invention could be applied to an electrochemical reference electrode in which case only a single electrical connection is required for such an electrode, thus eliminating the need of either the connectors 50 or 56, depending on the preferred conductor. The invention is also applicable to combination sensing-reference electrodes for measuring the ion concentration of solutions in which two internal half cells are required, one for the sensing electrode and one for the reference electrode. In such an electrode assembly, the internal half cell for the sensing electrode would be connected as shown in the drawings while the internal half cell for the reference electrode, which conventionally surrounds the sensing electrode, would be connected to the inner end of the outer male connector 56 in place of the shield 24 in the drawing.

It should also be understood that while the upper annular seal 32 is desired, it is not a necessary feature of the invention inasmuch as hermetic sealing for the cap to the tube 12 may be provided by use of the annular seal 30 alone. Thus, if the seal 32 is eliminated, the crimped end 80 of the sleeve 34 may bear directly against the upper end of the body 42. Also, there could be provided an outwardly extending annnular flange on the plastic body 42 adjacent the lower end of the annular wall 46 upon which the end of the sleeve 34 could be crimped for securing the cap assembly to the tube 12.

Although several embodiments of the invention have been disclosed herein for the purposes of illustration, it will be understood that various other changes can be made in the form, details, arrangement and proportions of the various parts in such embodiments without departing from the spirit and scope of the invention as defined by the appended claims.

What is claimed is:

1. An electrode assembly adapted to be electrically connected to a plug having inner and outer electrically conductive connectors comprising:
    a tube of nonconductive material having a sensing portion at one end thereof;
    said tube having an outwardly extending annular shoulder adjacent to but spaced from the other end thereof;
    an annular seal surrounding said tube and positioned against a portion of said shoulder adjacent to said other end;
    an electrical connector assembly comprising a nonconductive body supporting spaced inner and outer electrically conductive connectors adapted to contact said inner and outer electrically conductive connectors of said plug, said connector assembly closing said other end of said tube;
    said body having at one end thereof an annular wall surrounding said other end of said tube with the end of said wall bearing against said annular seal; and
    a sleeve surrounding said connector assembly, annular seal and annular shoulder on said tube, said sleeve having a first inwardly extending flange at one end thereof bearing against a portion of said shoulder remote from said other end of said tube and having a second inwardly extending flange at the other end thereof bearing against the other end of said body, said sleeve and flanges being so arranged with respect to said tube and connector assembly as to compress said annular seal between said shoulder on said tube and said end of said annular wall.

2. An electrode assembly as set forth in claim 1 wherein said sensing portion is an ion sensitive barrier closing said one end of said tube;
    an internal half cell being positioned in said tube so as to be immersed in an electrolyte contacting said barrier; and
    a conductor for said half cell extending to said other end of said tube and being connected to said inner connector of said connector assembly.

3. An electrode assembly as set forth in claim 2 including a cylindrical metallic shield in said tube surrounding said half cell conductor along the major extent thereof, with the end of said shield adjacent to said other end of said tube contacting said outer connector of said connector assembly.

4. An electrode assembly as set forth in claim 1 including:
    a conductor in said tube, one end of said conductor extending to said sensing portion at said one end of said tube;
    said inner connector of said connector assembly comprising a tubular member coaxial with the longitudinal axis of said tube and extending beyond the other end of said body to provide a male connector; and
    the other end of said conductor extending into said tubular inner connector and being connected to a wall portion thereof.

5. An electrode assembly as set forth in claim 1 wherein said connector assembly is a unitary element.

6. An electrode assembly as set forth in claim 1 wherein said body includes a base portion integral with said annular wall and a cylindrical portion separating said inner and outer connectors of said connector assembly; said outer connector having at least one passage therein filled with the material of said body so as to provide a bridge of body material between said base and cylindrical portions of said body.

7. An electrode assembly as set forth in claim 1 wherein a second annular seal is positioned on the connector assembly; and
    said second inwardly extending flange on said metallic sleeve bearing against and compressing said second annular seal.

8. An electrode assembly adapted to be electrically connected to a plug having an electrically conductive connector comprising:
    a hollow tube of nonconductive material having a sensing portion at one end thereof and being open at its other end;
    an outwardly extending shoulder formed on said tube near said other end thereof;
    an electrical connector assembly comprising a nonconductive body supporting an electrically conductive connector adapted to contact said electrically conductive connector of said plug, said connector assembly substantially closing said other end of said tube and said body having a portion thereof overlying said other end of said tube; and
    a sleeve having a first inwardly extending flange at one end thereof closely adjacent to a portion of said shoulder which is remote from said other end of said tube and having a second inwardly extending flange at the other end thereof bearing against said nonconductive body, said sleeve and flanges being so arranged with respect to said shoulder and said nonconductive body as to fixedly engage and hermetically seal said connector assembly to said tube.

9. An electrode assembly as set forth in claim 8 including:
    a second electrically conductive connector supported by said nonconductive body and spaced from the first mentioned electrically conductive connector.

10. An electrode assembly as set forth in claim 9 including:
    an annular seal about said tube and positioned against a portion of said shoulder which is near to said other end of said tube; and
    said portion of said nonconductive body including an outer annular wall disposed about a portion of the outer surface of said tube, with the end of said wall bearing against said annular seal.

11. An electrode assembly as set forth in claim 8 including:
    an annular seal about said tube and positioned against a portion of said shoulder which is near to said other end of said tube; and
    said portion of said nonconductive body including an outer annular wall disposed about a portion of the outer surface of said tube, with the end of said wall bearing against said annular seal.

12. An electrode assembly as set forth in claim 11 wherein:
    said nonconductive body includes a base portion integral with said outer wall and a cylindrical portion supporting said connector; and
    a second electrically conductive connector supported by said body and separated from said first mentioned connector by said cylindrical portion.

13. An electrode assembly adapted to be electrically connected to a plug having an electrically conductive connector comprising:
- a tube of nonconductive material having a sensing portion at one end thereof;
- an outwardly extending annular shoulder disposed about said tube adjacent to but spaced from the other end thereof;
- an annular seal about said tube and positioned against a portion of said shoulder which is near said other end of said tube;
- an electrical connector assembly comprising a nonconductive body supporting an electrically conductive connector adapted to contact said electrically conductive connector of said plug, said connector assembly substantially closing said other end of said tube, and said nonconductive body having an outer wall disposed about a portion of the outer surface of said tube; and
- a sleeve disposed about said outer wall having a first inwardly extending flange at one end thereof bearing against a portion of said annular shoulder which is remote from said other end of said tube and having a second inwardly extending flange at the other end thereof bearing against said nonconductive body whereby said sleeve and flanges are so arranged with respect to said tube and said connector assembly as to sealably engage said connector assembly and said tube.

References Cited

UNITED STATES PATENTS

| 2,401,921 | 6/1946 | Fisher et al. | 285—256 |
| 2,748,250 | 8/1953 | Andrus | 204—197 |
| 2,756,203 | 7/1956 | Gilbert | 204—195.1 |
| 3,025,492 | 3/1962 | Dupre | 174—88.2 |
| 3,098,813 | 7/1963 | Beebe et al. | 204—1.1 |

JOHN H. MACK, Primary Examiner

T. TUNG, Assistant Examiner

U.S. Cl. X.R.

204—271, 272, 279, 286, 288, 289, 297; 285—256